US012792221B2

(12) United States Patent
Zhang

(10) Patent No.: US 12,792,221 B2
(45) Date of Patent: Nov. 10, 2026

(54) REPAIR METHOD AND CIRCUIT FOR MEMORY

(71) Applicant: CXMT Corporation, Hefei (CN)

(72) Inventor: Wei Zhang, Hefei (CN)

(73) Assignee: CXMT Corporation, Hefei (CN)

( * ) Notice: Subject to any disclaimer, the term of this patent is extended or adjusted under 35 U.S.C. 154(b) by 0 days.

(21) Appl. No.: 19/181,835

(22) Filed: Apr. 17, 2025

(65) Prior Publication Data

US 2026/0161297 A1 Jun. 11, 2026

Related U.S. Application Data

(63) Continuation of application No. PCT/CN2024/121111, filed on Sep. 25, 2024.

(30) Foreign Application Priority Data

Dec. 29, 2023 (CN) ........................ 202311871414.7

(51) Int. Cl.
*G06F 3/06* (2006.01)

(52) U.S. Cl.
CPC .......... *G06F 3/0614* (2013.01); *G06F 3/0653* (2013.01); *G06F 3/0673* (2013.01)

(58) Field of Classification Search
CPC ..... G06F 3/0614; G06F 3/0673; G06F 3/0653
See application file for complete search history.

(56) References Cited

U.S. PATENT DOCUMENTS 10,755,799 B1 * 8/2020 Montierth ........... G11C 11/4094
2017/0040066 A1 * 2/2017 Kim ...................... G11C 29/24
2018/0082754 A1 * 3/2018 Chi ...................... G11C 29/027
2020/0243158 A1 * 7/2020 Wilson ................... G11C 29/32
2022/0171543 A1 * 6/2022 Jway ...................... G11C 29/18
(Continued)

FOREIGN PATENT DOCUMENTS

CN 105825897 B 8/2016
CN 106257595 A 12/2016
(Continued)

OTHER PUBLICATIONS

International Search Report & Written Opinion mailed Nov. 20, 2024, regarding PCT/CN2024/121111.

*Primary Examiner* — Mark A Giardino, Jr.

(74) *Attorney, Agent, or Firm* — Intellectual Valley Law, P.C.

(57) ABSTRACT

A repair method and circuit for a memory is provided. The repair method includes the steps as follows: the memory receives a repair instruction sent from the outside, where the repair instruction carries a failed address, and the failed address is a memory cell address of a failed memory cell. A fuse array is broadcast and whether a currently broadcast fuse address is a target fuse address is sequentially determined, until at least one target fuse address is found, where the target fuse address is a fuse address mapped to a target redundant address, and the target redundant address is a redundant address capable of repairing the failed address. The failed address is written into the first unused target fuse address in the at least one target fuse address, to access the target redundant address when a request for accessing the failed address is received.

8 Claims, 9 Drawing Sheets

(56) References Cited

U.S. PATENT DOCUMENTS

| | | | | |
|---|---|---|---|---|
| 2023/0020753 | A1 | 1/2023 | Fujiwara et al. | |
| 2026/0051359 | A1 * | 2/2026 | Rice | G11C 29/14 |

FOREIGN PATENT DOCUMENTS

| | | | |
|---|---|---|---|
| CN | 112331250 | A | 2/2021 |
| CN | 113744793 | A | 12/2021 |
| CN | 115206404 | A | 10/2022 |
| CN | 115831184 | A | 3/2023 |

* cited by examiner

REPAIR METHOD AND CIRCUIT FOR MEMORY

CROSS-REFERENCE TO RELATED APPLICATIONS

This application is a continuation of International Patent Application No. PCT/CN 2024/121111, filed on Sep. 25, 2024, which is based on and claims priority of the Chinese Patent Application No. 202311871414.7, filed with the China National Intellectual Property Administration on Dec. 29, 2023 and entitled "REPAIR METHOD AND CIRCUIT FOR MEMORY". The above-referenced application is incorporated herein by reference in their entireties.

BACKGROUND

A memory may fail during production and use, for example, a WL (Word Line) failure, a BL (Bit Line) failure, or a memory cell failure may occur during production and use of a DRAM (Dynamic Random Access Memory). After the memory is packaged, a failed address may be repaired with a PPR (Post Package Repair) method. However, redundant addresses specified for PPR repair in the memory are very limited, and may be unable to meet an actual repair requirement.

SUMMARY

The present disclosure relates to the field of semiconductor technologies, and in particular, to provide a repair method and circuit for a memory.

According to a first aspect, an embodiment of the present disclosure provides a repair method for a memory. The memory includes a memory array and a fuse array. The memory array includes multiple memory cells and multiple redundant cells, the memory cells have memory cell addresses, and the redundant cells have redundant addresses. The fuse array includes multiple fuse cells, and the fuse cells have fuse addresses. At least a part of the fuse addresses are in one-to-one mapping with preset redundant addresses. The repair method includes the steps as follows:

- The memory receives a repair instruction sent from the outside, where the repair instruction carries a failed address, and the failed address is a memory cell address of a failed memory cell.
- The fuse array is broadcast and whether a currently broadcast fuse address is a target fuse address is sequentially determined, until at least one target fuse address is found, where the target fuse address is fuse address mapped to a target redundant address, and the target redundant address is redundant address capable of repairing the failed address.
- The failed address is written into the first unused target fuse address in the at least one target fuse address, to access the target redundant address when a request for accessing the failed address is received.

According to a second aspect, an embodiment of the present disclosure further provides a repair circuit for a memory. The memory includes a memory array and a fuse array. The memory array includes multiple memory cells and multiple redundant cells, the memory cells have memory cell addresses, and the redundant cells have redundant addresses. The fuse array includes multiple fuse cells, and the fuse cells have fuse addresses. At least a part of the fuse addresses are in one-to-one mapping with preset redundant addresses. The repair circuit includes:

- an instruction receiving unit, configured to receive a repair instruction sent from the outside, where the repair instruction carries a failed address configured to indicate a failed memory cell address;
- an address broadcasting unit, connected to the fuse array and the instruction receiving unit, and configured to broadcast the fuse array;
- an address searching unit, connected to the address broadcasting unit, and configured to sequentially receive fuse addresses broadcast by the address broadcasting unit and determine whether a currently broadcast fuse address is a target fuse address, until at least one target fuse address is found, where the target fuse address is fuse address mapped to a target redundant address, and the target redundant address is redundant address capable of repairing the failed address; and
- an address programming unit, connected to the fuse array and the address searching unit, and configured to: decode the first unused target fuse address in the at least one target fuse address, and program the failed address into a fuse cell corresponding to the target fuse address.

According to a third aspect, an embodiment of the present disclosure further provides a memory, including:

- a memory array, where the memory array includes multiple memory cells and multiple redundant cells, the memory cells have memory cell addresses, and the redundant cells have redundant addresses; and
- a peripheral circuit, where the peripheral circuit includes a fuse array, the fuse array includes multiple fuse cells, and the fuse cells have fuse addresses; and the repair circuit provided in any one of the foregoing embodiments.

In the embodiments of the present disclosure, a fuse array is broadcast to search for redundant addresses in one-to-one mapping with fuse addresses, and search for a redundant address that can be utilized to repair a failed address, and the first available redundant address is found during each time of repair. In this way, a large quantity of redundant address lines configured in the memory can be fully utilized, so that the redundant address lines are applied to repair of a failed address after package. Therefore, more repair requirements can be met, and the waste of redundant address resources is reduced.

DESCRIPTION OF EMBODIMENTS

For ease of understanding of the present disclosure, a more comprehensive description of the present disclosure is provided below with reference to related accompanying drawings. A preferred embodiment of the present disclosure is provided in the accompanying drawings. However, the present disclosure may be implemented in many different forms, and is not limited to the embodiments described in this specification. On the contrary, the purpose of providing these embodiments is to make the content of the present disclosure more thorough and comprehensive.

Unless otherwise defined, all technical and scientific terms employed in this specification have meanings the same as those commonly understood by a person skilled in the technical field of the present disclosure. The terms employed in the specification of the present disclosure are merely intended to describe specific embodiments, and are not intended to limit the present disclosure. The term "and/or" employed in this specification includes any and all combinations of one or more related items listed.

Figure 1:
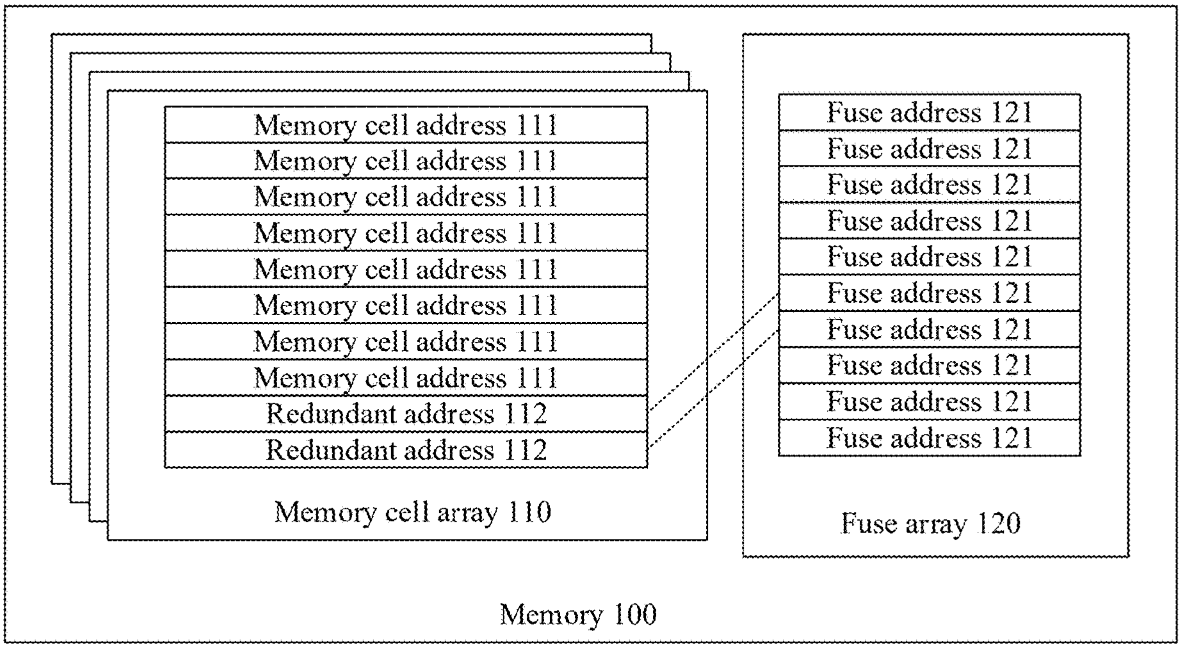
FIG. 1 is a schematic diagram of a memory according to an embodiment of the present disclosure.
Figure 2:
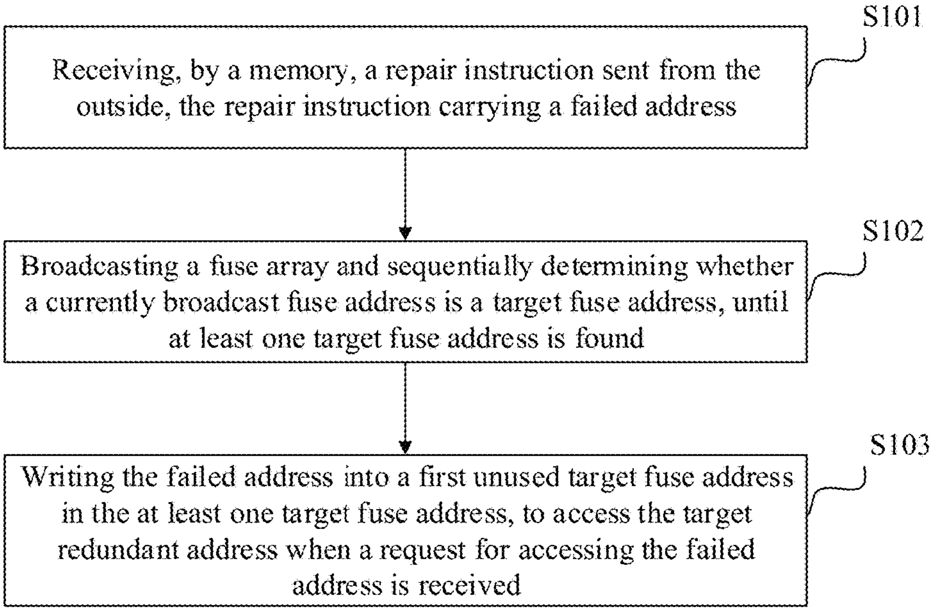
FIG. 2 is a first flowchart of a repair method for a memory according to an embodiment of the present disclosure.

An embodiment of the present disclosure provides a repair method for a memory. As shown in FIG. 1, the memory 100 includes a memory array 110 and a fuse array 120. The memory array 110 includes multiple memory cells and multiple redundant cells, the memory cells have memory cell addresses 111, and the redundant cells have redundant addresses 112. The fuse array 120 includes multiple fuse cells, and the fuse cells have fuse addresses 121. At least a part of the fuse addresses 121 are in one-to-one mapping with preset redundant addresses 112. As shown in FIG. 2, the repair method includes the steps as follows.

- In the step of S101, the memory receives a repair instruction sent from the outside, where the repair instruction carries a failed address, and the failed address is a memory cell address of a failed memory cell.
- In the step of S102, the fuse array is broadcast and whether a currently broadcast fuse address is a target fuse address is sequentially determined, until at least one target fuse address is found, where the target fuse address is fuse address mapped to a target redundant address, and the target redundant address is redundant address capable of repairing the failed address.
- In the step of S103, the failed address is written into the first unused target fuse address in the at least one target fuse address, to access the target redundant address when a request for accessing the failed address is received.

In this embodiment of the present disclosure, each of the memory cells in the memory is configured to store data. However, the memory cell may fail to store data normally or may store incorrect data due to a failure. A failure may be a failure of a single memory cell, e.g., a transistor failure of a memory cell or a failure caused by leakage of a storage capacitor; or may be a WL failure or a BL failure. Each of the redundant cells has the same structure as the memory cell, but does not participate in data reading and writing of a normal memory cell. To be specific, in a normal case, the redundant cell is not accessed, and only in a case of a failure, the normal memory cell may be replaced with the redundant cell to participate in data storage and reading and writing.

The memory cell addresses may include a row address, a column address, an address of a bank, an address of a bank group, and the like. The redundant addresses also include a row address, a column address, an address of a bank, an address of a bank group, and the like. If a memory cell fails, the row address, the column address, the address of the bank, and the address of the bank group are required to position the memory cell. If a WL fails, only the row address and the bank address or the bank group address are required to position the WL. If a BL fails, the column address, the bank address, the bank group address, and the like are required to position the BL. If the foregoing repair operation is performed inside the bank, only the row address or the column address is required to position a failed WL and a failed BL.

In this embodiment of the present disclosure, the foregoing memory further includes a fuse array, and the fuse array includes a large quantity of one time programmable (One Time Programmable, OTP) fuse cells. Multiple fuse cells may be utilized as one group to store addresses (e.g., a failed memory cell address) and parameters such as a trimming parameter. One fuse address may be configured to position one group of fuse cells. Therefore, if the group of fuse cells stores one piece of address data (the address data includes multiple bits), the fuse address may be configured to search for the address data stored in the group of fuse cells.

In this embodiment of the present disclosure, a part of the multiple fuse addresses in the fuse array may be in one-to-one mapping with the redundant addresses, that is, each of the fuse addresses corresponds to one redundant address. The mapping relationship may be fixedly set in the memory. For example, the mapping relationship is implemented through a local register and a fixed decoding manner of an address decoder. Specifically, the local register is disposed in the memory, and is connected to the address decoder. The local register may store multiple addresses in order, and the multiple addresses correspond to the part, in the fuse array, that is configured to map to the redundant addresses. To be specific, when address information stored in the fuse array is read, the address information is stored at a corresponding location in the local register. When being transmitted to the address decoder, each address stored in the local register is decoded to a redundant address corresponding to the address. In this way, one-to-one mapping between the fuse addresses and the redundant addresses is implemented.

For ease of understanding, an example is provided as follows:

A fuse array includes fuse[127:0], a total of 128 addresses, where fuse[127:64], that is, the $64^{th}$ to $127^{th}$ fuse addresses, is configured to map to redundant addresses rwl[63:0] in a one-to-one manner. When the fuse array fuse[127:64] is read, read content is stored in the foregoing local register. The content stored in the local register is decoded through the address decoder, and is sequentially decoded to the fixed redundant addresses rwl[63:0]. Therefore, if failed addresses fail [63:0] are stored in the fuse array fuse[127:64], the address decoder decodes, when accessing the failed addresses, the failed addresses stored in the local register, to decode the failed addresses to fixed redundant addresses to replace the failed addresses. For example, a failed address fail0 is accessed, and the failed address is stored in a fuse array fuse64. The failed address is read to the first address in the local register, and is decoded to the corresponding first redundant address rwl0. In this way, fail0 is replaced with rwl0.

In this embodiment of the present disclosure, the memory may perform PPR to repair a failed address, and the memory receives a repair instruction sent from the outside, to obtain a to-be-repaired failed address. The foregoing failed address may be a memory cell address of a failed memory cell, and includes a row address, a column address, an address of a bank or a bank group, and the like that are configured to position the memory cell. In some embodiments, the failed address may alternatively be a row address of a failed WL, a column address of a failed BL, or the like. In some embodiments, a memory cell may also be repaired by replacing a row or a column in which the memory cell is located with a redundant row or a redundant column.

During production of the memory, many redundant addresses are set. These redundant addresses usually may be utilized in a test and repair process before delivery. However, after delivery, usually only one or several fixed redundant addresses can be utilized for PPR. As a result, a large quantity of redundant addresses are no longer utilized after delivery of the memory, causing the waste of resources.

The redundant addresses in the memory and a part of the fuse addresses in the fuse array are in one-to-one mapping. Therefore, in this embodiment of the present disclosure, the fuse array is broadcast to sequentially scan the fuse addresses in the fuse array, and content stored in each of the fuse addresses is read to determine whether the fuse address is an available fuse address that can be configured to store a failed address and can serve as a target fuse address. Then, the failed address is written into the available fuse address, and with the mapping relationship between the fuse addresses and the redundant addresses, the failed address is directly decoded as a redundant address when being accessed, thereby repairing the failed address. Herein, a target redundant address mapped to the target fuse address is a redundant address that can be utilized to repair the failed address.

In this embodiment of the present disclosure, considering that the foregoing target fuse address may have been utilized in previous PPR, that is, another failed address has been stored in the target fuse address, it should be determined that the failed address is written into an unused target fuse address in the foregoing at least one target fuse address this time. Because the fuse addresses are sequentially read in order in the foregoing broadcast process, it can be sequentially determined whether each of the fuse addresses is the foregoing target fuse address and whether the fuse address has been used. If the first unused target fuse address is read, a current to-be-repaired failed address may be written into the target fuse address.

Therefore, a failed address may be written into a next target fuse address in next PPR. In this way, each of the fuse addresses may be accessed through polling in a broadcast manner, so that a redundant address corresponding to the fuse address has the opportunity to be utilized in PPR, thereby reducing the waste of redundant address resources.

Figure 3:
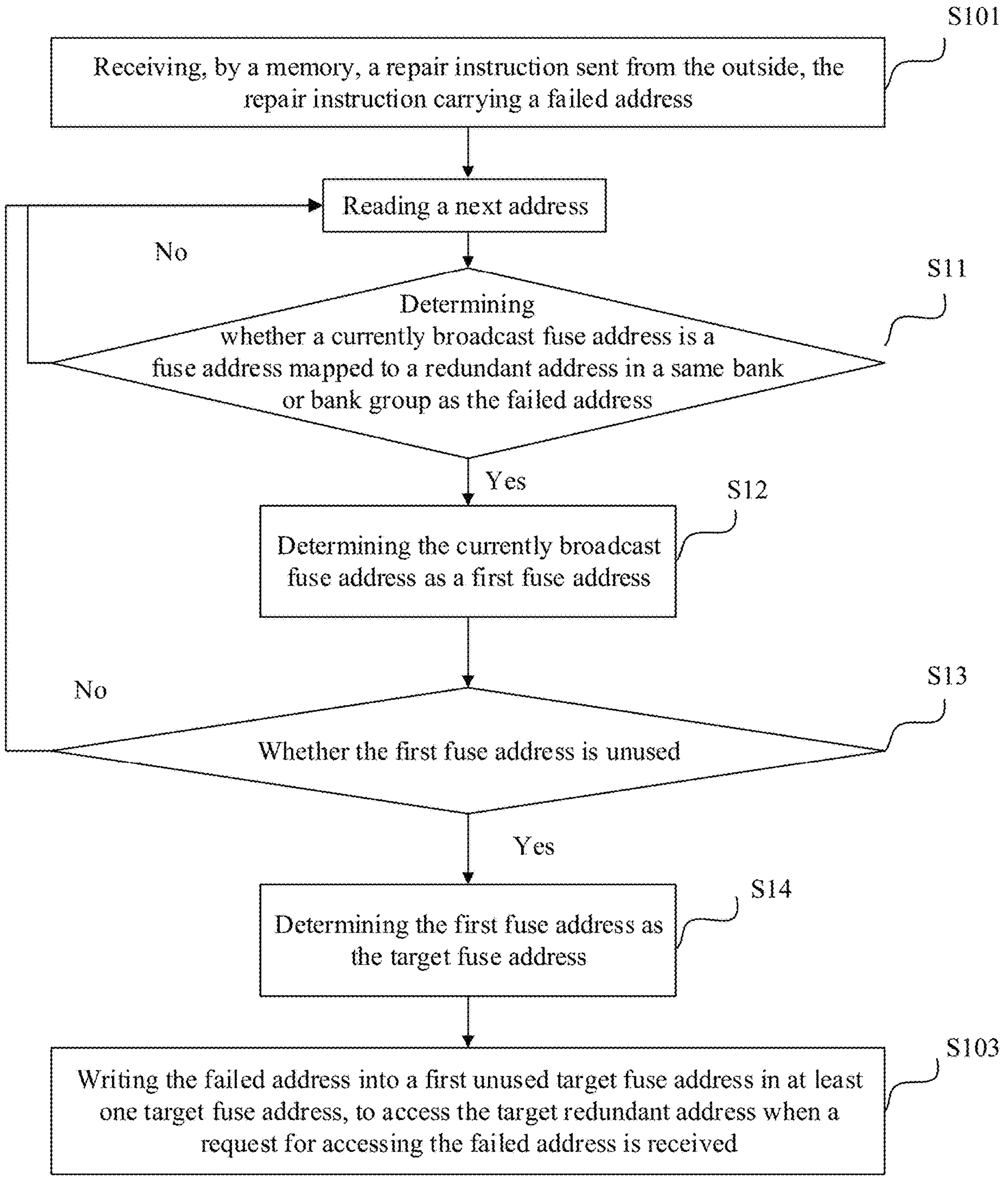
FIG. 3 is a second flowchart of a repair method for a memory according to an embodiment of the present disclosure.

In some embodiments, as shown in FIG. 3, in the foregoing step S102, that the fuse array is broadcast and whether a currently broadcast fuse address is a target fuse address is sequentially determined specifically includes the steps as follows:

In the step of S11, it is determined whether the currently broadcast fuse address is a fuse address mapped to a redundant address in the same bank or bank group as the failed address.

In the step of S12, if yes, the currently broadcast fuse address is determined as a first fuse address; or if no, a next address continues to be read.

In the step of S13, it is determined whether the first fuse address is unused.

In the step of S14, if yes, the first fuse address is determined as the target fuse address; or if no, a next address continues to be read.

The fuse array in the memory may serve multiple purposes. A part of the fuse array is mapped to the redundant addresses for repairing failed addresses. Another part of the fuse array may serve other purposes, for example, be utilized for storing a trimming parameter. Therefore, in the repair process in this embodiment of the present disclosure, a fuse address mapped to the target redundant address that can be utilized to repair a failed address needs to be found in a broadcast manner. In addition, in a manner of repair in the same bank/same bank group, to repair a failed address, a redundant address located in the same bank or bank group as the failed address needs to be utilized. Therefore, to find the target fuse address, it is further necessary to determine whether the currently broadcast fuse address is a fuse address mapped to the redundant address in the same bank or bank group as the failed address. If yes, the fuse address is defined as the first fuse address. In addition, it is further necessary to determine whether the fuse address is unused. If the fuse address is unused, the fuse address can be determined as the target fuse address. If the fuse address has been used, the first fuse address cannot be utilized to repair the failed address, and therefore a next address needs to continue to be read.

In some embodiments, in the foregoing step S11, that it is determined whether the currently broadcast fuse address is a fuse address mapped to a redundant address in the same bank or bank group as the failed address specifically includes the steps as follows.

In the step of S21, it is determined whether the currently broadcast fuse address is a fuse address mapped to the first redundant address in the same bank or bank group as the failed address.

In the step of S22, it is determined whether the currently broadcast fuse address is a fuse address mapped to the last redundant address in the same bank or bank group as the failed address.

The foregoing step S12 specifically includes S23 in which each fuse address between the fuse address mapped to the first redundant address in the same bank or bank group as the failed address and the fuse address mapped to the last redundant address in the same bank or bank group as the failed address is determined as the first fuse address.

Considering that a part of the fuse addresses in the fuse array that are in one-to-one mapping with redundant addresses in the same bank or bank group are usually consecutive, and the first redundant address in the bank or bank group is mapped to the first fuse address in the part of consecutive fuse addresses in the fuse array, when the target fuse address is searched for, only a fuse address mapped to the first redundant address needs to be found, that is, the first fuse address in the part of consecutive fuse addresses, and then a fuse address mapped to the last redundant address is found, that is, the last fuse address in the part of consecutive fuse addresses. Each fuse address between the two fuse addresses is the first fuse address, that is, fuse addresses that are in one-to-one mapping with the redundant addresses in the same bank or bank group as the failed address.

Therefore, during the broadcast, it is sequentially determined whether each of the fuse addresses is a fuse address mapped to the first redundant address, and whether each of the fuse addresses is a fuse address mapped to the last redundant address, to find fuse addresses mapped to the first redundant address and the last redundant address, and each fuse address between the two fuse addresses may be directly determined as the foregoing first fuse address. In this way, there is no need to determine, one by one, fuse addresses corresponding to the redundant addresses. Certainly, in another embodiment, if the mapping relationship between the redundant addresses and the fuse addresses is out of order, it is necessary to determine whether each of the fuse addresses corresponds to one redundant address.

In some embodiments, that the fuse array is broadcast specifically includes the step as follows:

A currently read out fuse address is determined by separately counting an area address, a row address, and a column address of the fuse array.

That it is determined whether the currently read out fuse address is a fuse address mapped to the first redundant address in the same bank or bank group as the failed address specifically includes the steps as follows:

It is determined whether count values of the area address, the row address, and the column address of the currently read out fuse address are an area address, a row address, and a column address of the fuse address mapped to the first redundant address; and if yes, a first target address indication signal is pulled up.

That it is determined whether the currently read out fuse address is a fuse address mapped to the last redundant address in the same bank or bank group as the failed address specifically includes the steps as follows:

It is determined whether the count values of the area address, the row address, and the column address of the currently read out fuse address are an area address, a row address, and a column address of the fuse address mapped to the last redundant address; and if yes, the first target address indication signal is pulled down.

In this embodiment of the present disclosure, the fuse array may be broadcast through an address counter. Specifically, the address counter may separately count the column address, the row address, and the area address, and in each time of counting, a count value is output as an address to the fuse array, to read a corresponding fuse address. It may be understood that, during counting, the address counter may sequentially increment the column address based on a jump of a broadcast clock, and the column address, the row address, and the area address all may be represented by a multi-bit binary number. When the column address is all 1, one bit is added to the row address and the column address is cleared. When the row address is all 1, one bit is added to the area address and the row address is cleared. In this way, the entire fuse array can be broadcast.

The foregoing step of determining whether a fuse address is the fuse address mapped to the first redundant address or the last redundant address may be implemented through a matching circuit. The matching circuit may be a circuit formed by a structure in a form of a comparator or a look-up table. An input terminal of the circuit may receive an address output by the address counter during the broadcast, including the foregoing area address, row address, column address, and the like. Generally, the circuit can output a low-level signal, that is, output logic 0. When an input address matches the fuse address mapped to the first redundant address, an output signal is pulled up to set output of the circuit to 1. When the input address matches the fuse address mapped to the last redundant address, the output signal is pulled down, to set the output of the circuit to 0. In this embodiment, a first target address indication signal is valid at a high level. In another embodiment, a first target address indication signal valid at a low level may alternatively be utilized. For this type of signal, the circuit can generally output a high-level signal, that is, output logic 1. When an input address matches the fuse address mapped to the first redundant address, an output signal is pulled down, to set output of the circuit to 0. When the input address matches the fuse address mapped to the last redundant address, the output signal is pulled up, to set the output of the circuit to 1.

It may be understood that, because fuse addresses between the fuse address mapped to the first redundant address and the fuse address mapped to the last redundant address are consecutively mapped to the redundant addresses, in a process of outputting the fuse addresses between the first redundant address and the last redundant address through broadcast, neither the fuse address mapped to the first redundant address nor the fuse address mapped to the last redundant address is matched, so that a signal output by the foregoing circuit is no longer changed. Because output of the circuit is pulled up when the first redundant address is matched, the circuit keeps outputting a high-level signal during this period.

In other words, in a phase in which the first fuse address is matched during the broadcast, the foregoing matching circuit continuously outputs the high-level signal until a first fuse address corresponding to the last redundant address is matched, and then switches to output a low-level signal. In this way, when the signal output by the matching circuit, that is, the first target address indication signal, is 1, it indicates that the currently broadcast fuse address is the first fuse address. In the period during which the first target indication signal is 1, it may be further determined whether the broadcast fuse address has been used, to determine the target fuse address.

In some embodiments, the method further includes the steps as follows:

If the currently read out fuse address is mapped to the last redundant address, and the current first fuse address is not an unused fuse address, a value of a resource register in a current bank or bank group is updated to a first value indicating no available redundant address, and a repair operation is terminated.

The value stored in the resource register is configured to indicate whether a redundant address that can be utilized to repair a failed address still exists in the current bank or bank group. When the value is the first value, it indicates that there is no available redundant address in the current bank or bank group, that is, redundant addresses in the current bank or bank group have been used up. Correspondingly, other failed addresses have been stored in all fuse addresses in one-to-one mapping with the redundant addresses. Therefore, the failed address cannot be repaired in this case, so that the repair operation can be terminated.

Correspondingly, when there is still an available redundant address in the current bank or bank group, the value stored in the resource register may be a second value different from the first value. Therefore, in a subsequent repair process, the value of the resource register may be directly detected to determine whether the repair operation can be further performed. If it is detected that the value stored in the resource register is the first value, detection does not need to be started, that is, the foregoing operations such as broadcasting do not need to be started. It may be understood that, in this embodiment of the present disclosure, after the repair instruction sent from the outside is received, the foregoing method may further include the steps as follows: A value stored in a resource register in a bank or a bank group in which a failed address is located is detected; and if the value is a first value, repair is terminated, and repair failure information may be fed back; or if the value is a second value, the step of broadcasting the fuse array can continue to be performed.

Each of the fuse addresses may include multiple fuse cells configured to store failed addresses, and may further include at least one flag bit configured to indicate whether the fuse address has been used. Therefore, a flag bit of a fuse address can be detected to determine whether the fuse address has been used.

Figure 4:
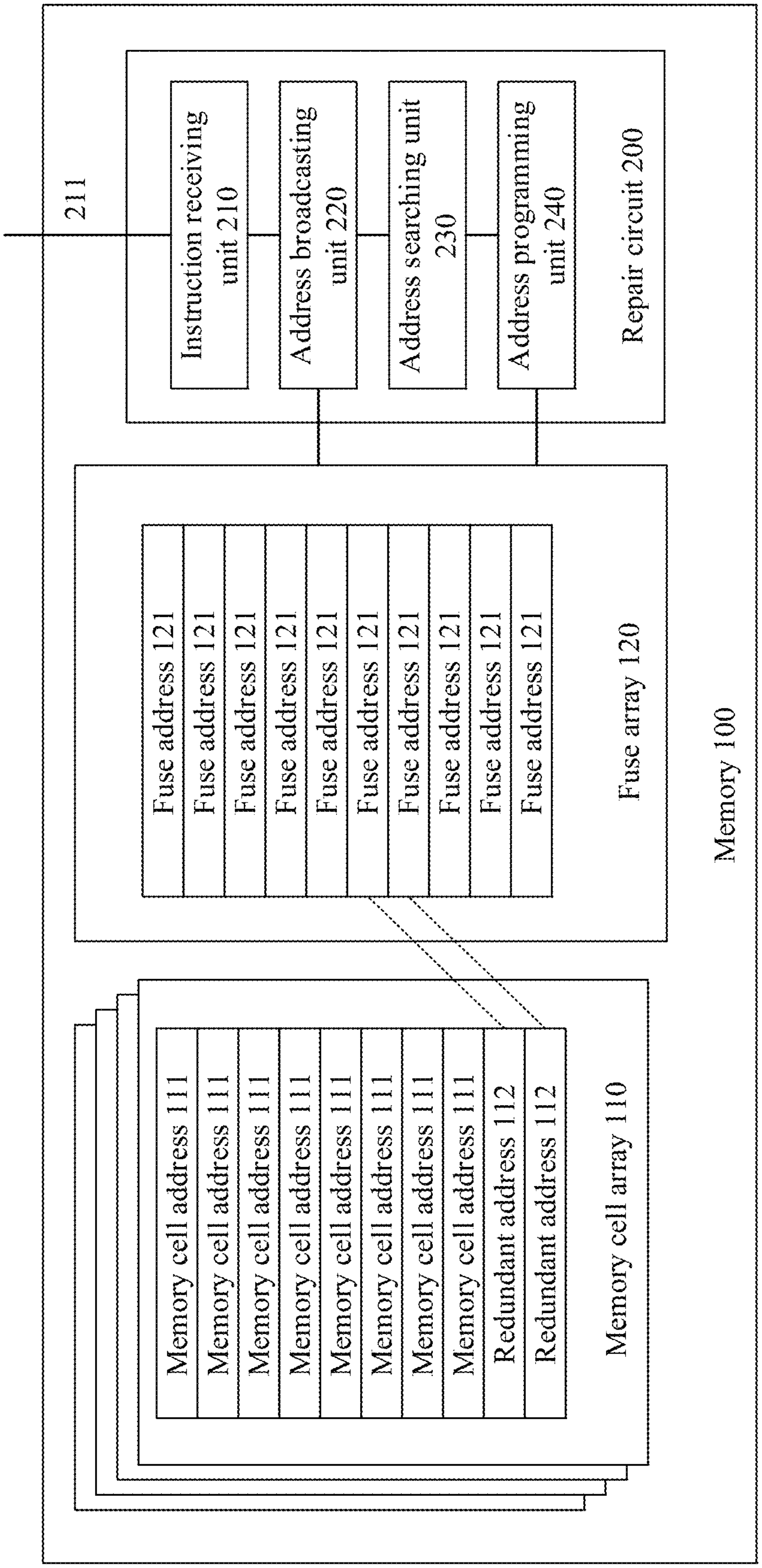
FIG. 4 is a schematic structural diagram of a repair circuit for a memory according to an embodiment of the present disclosure.
Figure 9:
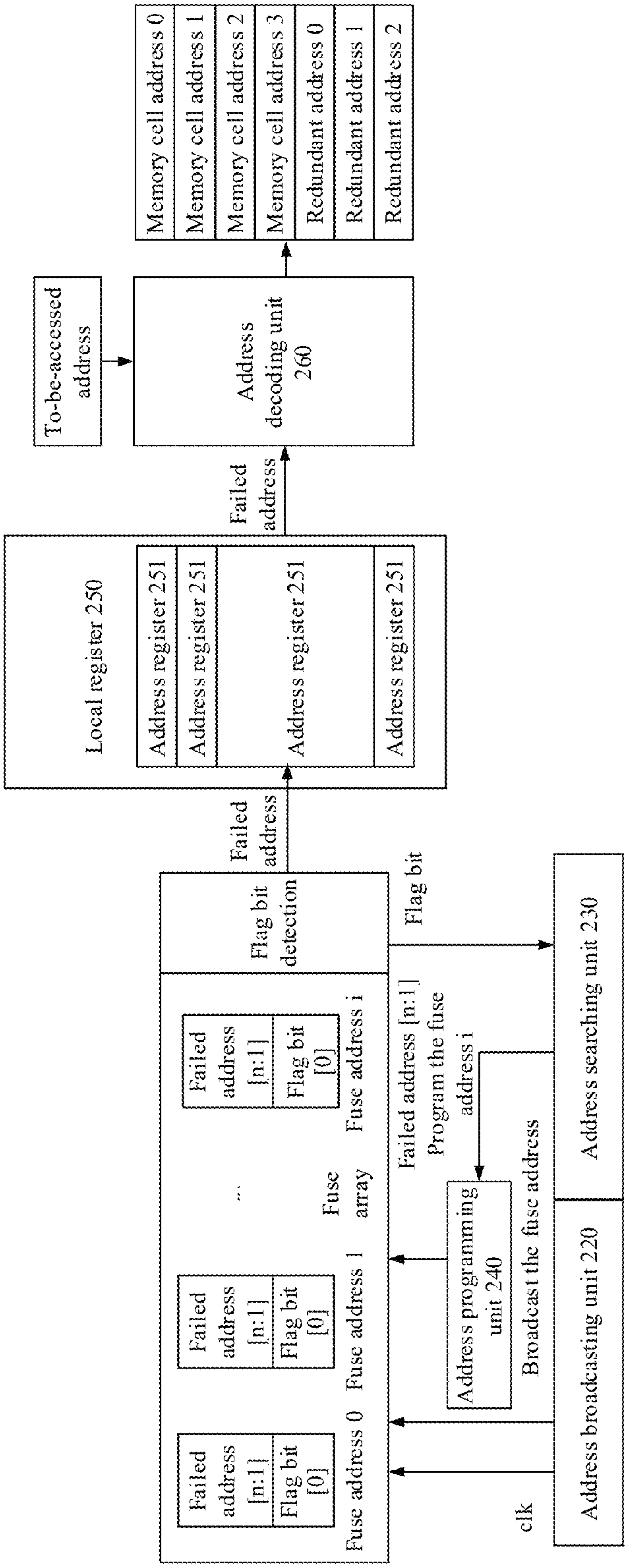
FIG. 9 is a schematic structural diagram of another repair circuit for a memory according to an embodiment of the present disclosure.

FIG. 4 is a schematic diagram of a repair circuit 200 for a memory according to an embodiment of the present disclosure. The memory 100 includes a memory array 110 and a fuse array 120. The repair circuit 200 and the fuse array 120 are located in a peripheral circuit of the memory 100. The memory array 110 includes multiple memory cells and multiple redundant cells, the memory cells have memory cell addresses 111, and the redundant cells have redundant addresses 112. The fuse array 120 includes multiple fuse cells, and the fuse cells have fuse addresses 121. At least a part of the fuse addresses 121 are in one-to-one mapping with preset redundant addresses 112. As shown in FIG. 4 and FIG. 9, the repair circuit 200 includes:

- an instruction receiving unit 210, configured to receive a repair instruction 211 sent from the outside, where the repair instruction carries a failed address 113 configured to indicate a failed memory cell address;
- an address broadcasting unit 220, connected to the fuse array 120 and the instruction receiving unit 210, and configured to broadcast the fuse array 120;
- an address searching unit 230, connected to the address broadcasting unit 220, and configured to sequentially receive fuse addresses 121 broadcast by the address broadcasting unit 220 and determine whether a currently broadcast fuse address 121 is a target fuse address, until at least one target fuse address is found, where the target fuse address is the fuse address 121 mapped to a target redundant address, and the target redundant address is the redundant address 112 capable of repairing the failed address 113; and
- an address programming unit 240, connected to the fuse array 120 and the address searching unit 230, and configured to decode the first unused target fuse address in the at least one target fuse address, and program the failed address 113 into a fuse cell corresponding to the target fuse address.

In this embodiment of the present disclosure, each of the memory cells in the memory is configured to read and write data. However, the memory cell may fail to read and write data normally due to a failure. A failure may be a failure of a single memory cell, e.g., a transistor failure of a memory cell or a failure caused by leakage of a storage capacitor; or may be a WL failure or a BL failure. Each of the redundant cells has the same structure as the memory cell, but does not participate in data reading and writing of a normal memory cell. To be specific, in a normal case, the redundant cell is not accessed, and only in a case of a failure, the normal memory cell may be replaced with the redundant cell to participate in data reading and writing.

The memory cell addresses may include a row address, a column address, an address of a bank, an address of a bank group, and the like. The redundant addresses also include a row address, a column address, an address of a bank, an address of a bank group, and the like. If a memory cell fails, the row address, the column address, the address of the bank, and the address of the bank group are required to position the memory cell. If a WL fails, only the row address and the bank or the bank group are required to position the WL. If a BL fails, the column address, the bank, the bank group, and the like are required to position the BL. For a failed memory cell, a redundant cell row may also be utilized to replace a memory cell in the row to implement repair with a redundant row, or a redundant cell column is utilized to replace a memory cell in the column to implement repair with a redundant column. If the foregoing repair operation is performed inside the bank, only the row address or the column address is required to position a failed WL and a failed BL.

In this embodiment of the present disclosure, the foregoing memory further includes a fuse array, and the fuse array includes a large quantity of one time programmable fuse cells. Multiple fuse cells are one group to store parameters such as addresses. One fuse address may be configured to position one group of fuse cells. Therefore, if the group of fuse cells stores one piece of address data, the fuse address may be configured to search for the address data stored in the group of fuse cells.

In this embodiment of the present disclosure, a part of the multiple fuse addresses in the fuse array may be in one-to-one mapping with the redundant addresses, that is, each of the fuse addresses corresponds to one redundant address. The mapping relationship may be fixedly set in the memory. For example, the mapping relationship is implemented through a local register and a fixed decoding manner of an address decoder. Specifically, the local register is disposed in the memory, and is connected to the address decoder. The local register may store multiple addresses in order, and the multiple addresses correspond to the part, in the fuse array, that is configured to map to the redundant addresses. To be specific, when address information stored in the fuse array is read, the address information is stored at a corresponding location in the local register. When being transmitted to the address decoder, each address stored in the local register is decoded to a redundant address corresponding to the address. In this way, one-to-one mapping between the fuse addresses and the redundant addresses is implemented.

In this embodiment of the present disclosure, the memory may perform PPR to repair a failed address, and the memory receives a repair instruction sent from the outside, to obtain a to-be-repaired failed address. The foregoing failed address may be a memory cell address of a failed memory cell, and includes a row address, a column address, an address of a bank or a bank group, and the like that are configured to position the memory cell. In some embodiments, the failed address may alternatively be a row address of a failed WL, a column address of a failed BL, or the like.

During production of the memory, many redundant addresses are set. These redundant addresses usually may be utilized in a test and repair process before delivery. However, after delivery, usually only one or several fixed redundant addresses can be utilized for PPR. As a result, a large quantity of PPRs are no longer utilized after delivery of the memory, causing the waste of resources.

The redundant addresses in the memory and a part of the fuse addresses in the fuse array are in one-to-one mapping. Therefore, in this embodiment of the present disclosure, the fuse array is broadcast to sequentially scan the fuse addresses in the fuse array, and content stored in each of the fuse addresses is read to determine whether the fuse address is an available fuse address that can be configured to store a failed address and can serve as a target fuse address. Then, the failed address is written into the available fuse address, and with the mapping relationship between the fuse addresses and the redundant addresses, the failed address is directly decoded as a redundant address when being accessed, thereby repairing the failed address. Herein, a target redundant address mapped to the target fuse address is a redundant address that can be utilized to repair the failed address.

In this embodiment of the present disclosure, considering that the foregoing target fuse address may have been utilized in previous PPR, that is, another failed address has been stored in the target fuse address, it should be determined that the failed address is written into an unused target fuse address in the foregoing at least one target fuse address this time. Because the fuse addresses are sequentially read in order in the foregoing broadcast process, it can be sequentially determined whether each of the fuse addresses is the foregoing target fuse address and whether the fuse address has been used. If the first unused target fuse address is read, a current to-be-repaired failed address may be written into the target fuse address.

Therefore, a failed address may be written into a next target fuse address in next PPR. In this way, each of the fuse addresses may be accessed through polling in a broadcast manner, so that a redundant address corresponding to the fuse address has the opportunity to be utilized in PPR, thereby reducing the waste of redundant address resources.

In this embodiment of the present disclosure, the instruction receiving unit 210 may include a pin for receiving an instruction. The instruction receiving unit 210 may further include an instruction decoding unit decoding a received instruction into an identifiable repair instruction, and an address decoding unit decoding a received address.

In this embodiment of the present disclosure, the address broadcasting unit 220 sequentially broadcasts the fuse addresses in a polling manner, so that the fuse addresses in the fuse array 120 can be sequentially read. The address broadcasting unit 220 may be implemented through a counter, and sequentially output the fuse addresses to the fuse array 120 by counting the addresses, to read content stored in a corresponding fuse address. In a read process, the address broadcasting unit 220 further sequentially outputs the fuse addresses 121 to the address searching unit 230. The address searching unit 230 determines, based on a received fuse address, whether the address is a target fuse address mapped to a redundant address.

The address broadcasting unit 220 sequentially broadcasts the fuse addresses. Therefore, when the address searching unit 230 finds the target fuse address, the address programming unit 240 may program a failed address into the first unused target fuse address. After the programming, the address broadcast may be terminated. In this way, a to-be-repaired failed address is written into a fuse address mapped to a redundant address. When receiving a request for accessing the failed address, the memory may decode the failed address to a corresponding redundant address through the mapping relationship between the fuse addresses and the redundant addresses, to replace the failed address with the redundant address.

Figure 5:
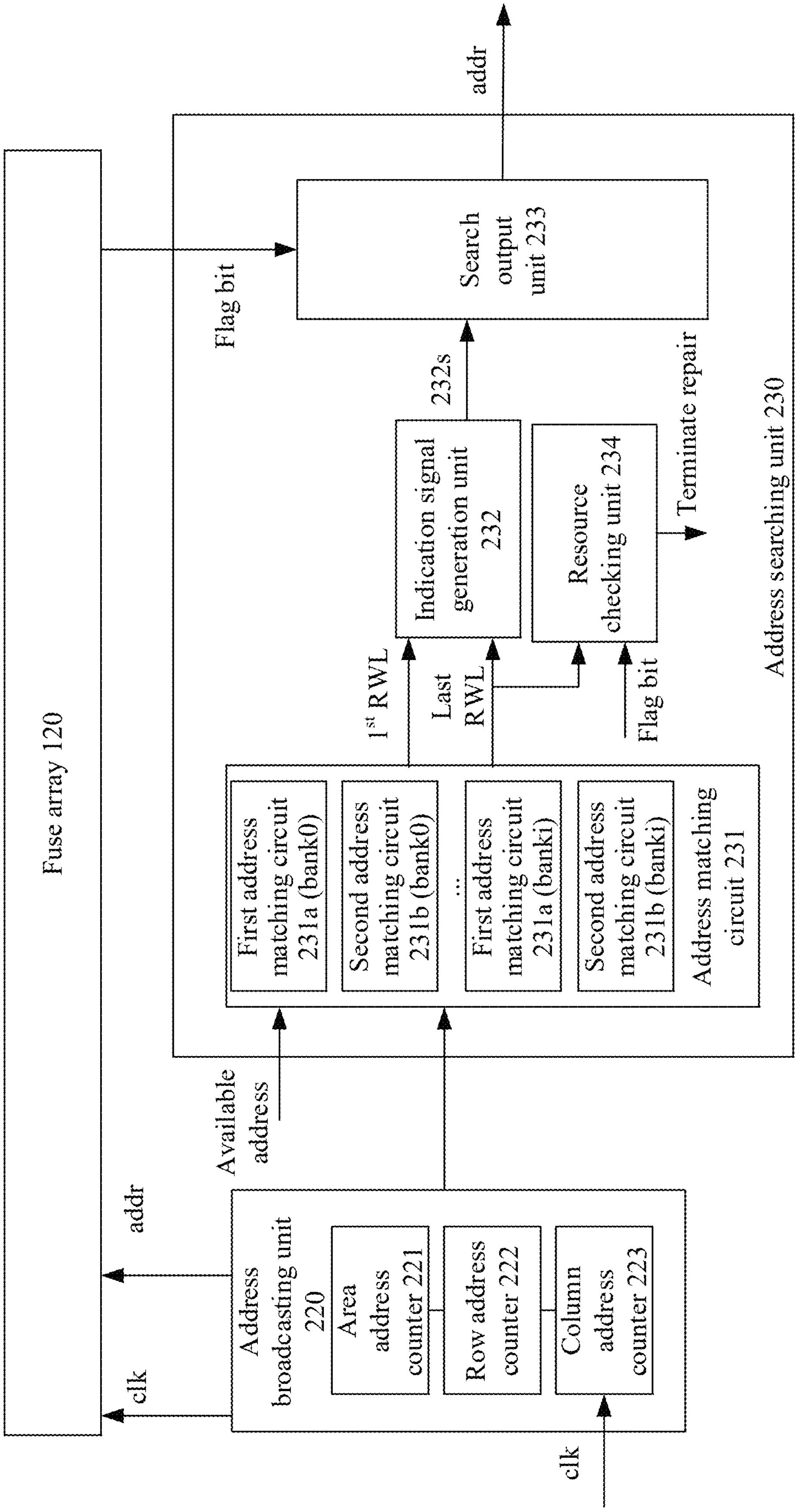
FIG. 5 is a schematic diagram of a partial structure of a repair circuit according to an embodiment of the present disclosure.

In some embodiments, as shown in FIG. 5, the address broadcasting unit 220 includes an area address counter 221, a row address counter 222, and a column address counter 223.

The area address counter 221 is connected to the row address counter 222, and is configured to update a count value when the row address counter 222 counts to the last bit.

The row address counter 222 is connected to the column address counter 223, and is configured to update a count value when the column address counter 223 counts to the last bit.

An input terminal of the column address counter 223 is configured to receive an address broadcast clock signal clk, and the column address counter 223 is configured to update a count value when the address broadcast clock signal clk jumps.

The address broadcasting unit 220 may sequentially count a column address, a row address, and an area address in order to generate address count values, and each of the address count values corresponds to one fuse cell address addr. In this way, the address count values can be broadcast to sequentially read the fuse addresses in the fuse array.

In some embodiments, as shown in FIG. 5, the address searching unit 230 includes:

- an address matching circuit 231, connected to the address broadcasting unit 220 to sequentially receive the fuse addresses addr broadcast by the address broadcasting unit 220, and configured to match, based on the fuse addresses addr broadcast by the address broadcasting unit 220, a fuse address mapped to the first redundant address in at least one bank or bank group, and a fuse address mapped to the last redundant address in the at least one bank or bank group;
- an indication signal generation unit 232, connected to the address matching circuit 231, and configured to: output a high-level signal when a broadcast fuse address matches the fuse address mapped to the first redundant address, and output a low-level signal when the broadcast fuse address matches the fuse address mapped to the last redundant address; and
- a search output unit 233, connected to the fuse array 120 and the address broadcasting unit 220, and configured to: read, based on a fuse address broadcast by the address broadcasting unit 220, flag bit information of the fuse address, and output the fuse address when the flag bit information indicates that the fuse address is unused.

In some embodiments, a flag bit of the fuse address includes 1 bit. When the flag bit is a first value (e.g., “0”), it indicates that the first fuse address is unused. When the flag bit is a second value (e.g., “1”), it indicates that the first fuse address has been used.

In some other embodiments, the flag bit includes at least two bits. When a first value (e.g., “0”) is obtained after a first operation (e.g., an AND operation, an OR operation, or an exclusive OR operation) is performed on the at least two bits in the flag bit, it indicates that the first fuse address is unused. When a second value (e.g., “1”) is obtained after the first operation is performed on the at least two bits in the flag bit, it indicates that the first fuse address has been used.

The flag bit information is a value of the flag bit or a value obtained after the first operation is performed on the flag bit. One fuse address may include several bits configured to store an address, and may further include one bit or at least two bits utilized as the foregoing flag bit. For example, one fuse address includes 17 bits, where 16 bits are configured to store an address, and the other 1 bit is the flag bit. It may be understood that, when a fuse address is unused, flag bit information of the fuse address should be an initial value, which is configured to indicate that the fuse address stores no address. After an address is written into the fuse address, the flag bit information should also be modified to a value indicating that the fuse address has been used.

In this way, the foregoing search output unit 233 may detect flag bit information of each target fuse address to determine whether the target fuse address has been used. After the first unused target fuse address is found, the fuse address may be output, so that the address programming unit 240 programs a failed address into the fuse address.

In some embodiments, as shown in FIG. 5, the address matching circuit 231 includes:

- a first matching circuit 231*a*, configured to: determine whether the broadcast fuse address matches the fuse address mapped to the first redundant address, and output a first matching signal (1st RWL) to the indication signal generation unit when the broadcast fuse address matches the fuse address mapped to the first redundant address; and
- a second matching circuit 231*b*, configured to: determine whether the broadcast fuse address matches the fuse address mapped to the last redundant address, and output a second matching signal last RWL to the indication signal generation unit when the broadcast fuse address matches the fuse address mapped to the last redundant address.

The indication signal generation unit 232 includes a first latch, where an output signal of the first latch is an indication signal 232*s*. The first latch outputs the high-level signal when receiving the first matching signal, and outputs the low-level signal when receiving the second matching signal. For example, the indication signal generation unit 232 may be an RS latch.

Figure 6:
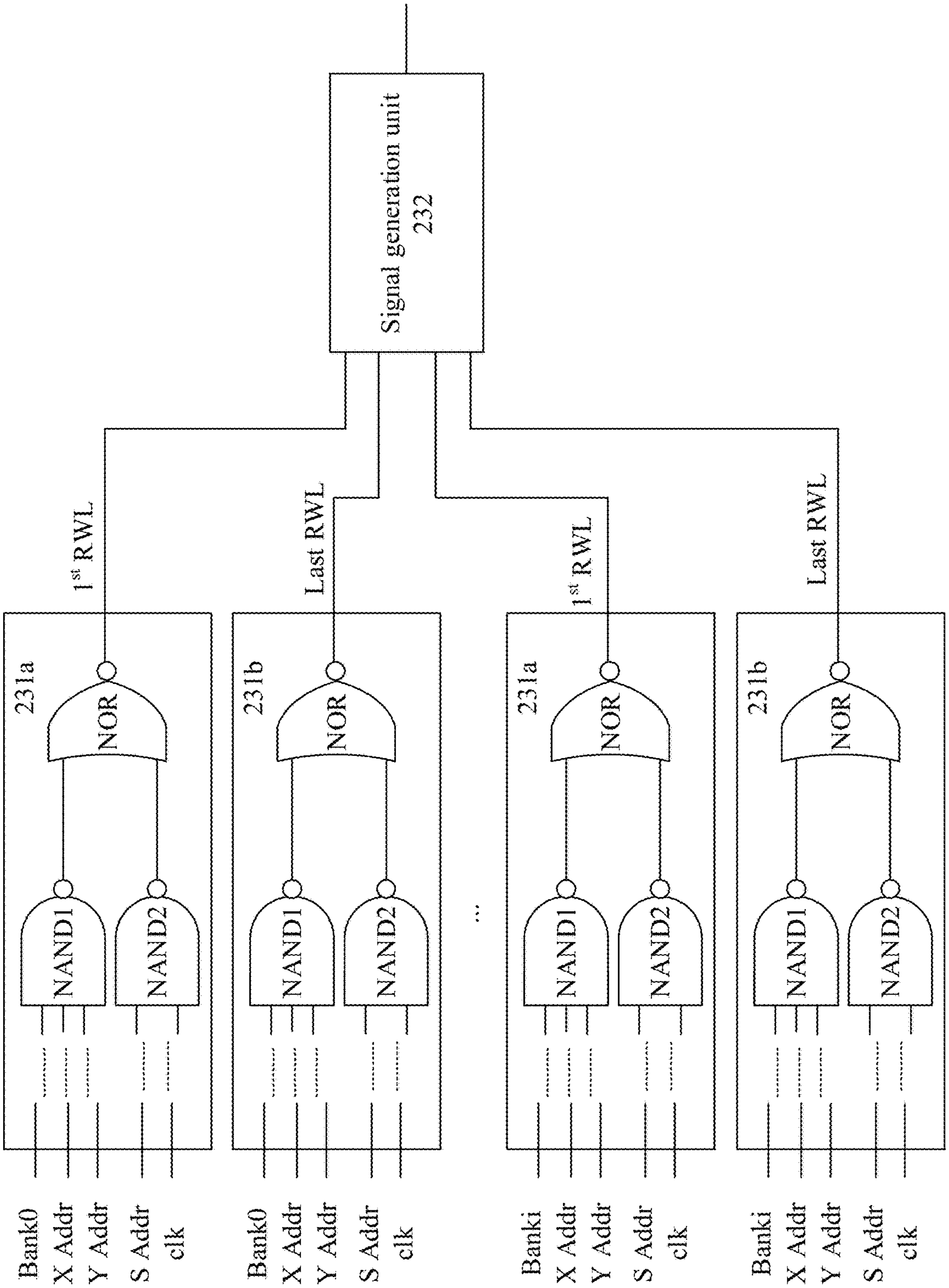
FIG. 6 is a schematic diagram of an address matching circuit and a signal generation unit in a repair circuit according to an embodiment of the present disclosure.

In some embodiments, as shown in FIG. 6, the address searching unit 230 further includes: a resource checking unit 234, connected to the address matching circuit 231, and configured to receive the second matching signal (Last RWL) output when the last redundant address is matched. In addition, when receiving the second matching signal Last RWL, the resource checking unit 234 detects flag bit information of a current fuse address to determine whether the fuse address has been used. If the fuse address has been used, it indicates that there is no available redundant cell and a corresponding fuse cell in a current bank or bank group. In this case, repair may be terminated, and a value of a resource register in the current bank or bank group is updated to a value indicating no available redundant address.

It should be noted that the repair circuit in this embodiment of the present disclosure may configure the first matching circuit 231*a* and the second matching circuit 231*b* for each bank or bank group, for example, first matching circuits 231*a* and second matching circuits 231*b* corresponding to the first bank bank0 and the $i^{th}$ bank banki shown in FIG. 5. In other words, each first matching circuit 231*a* and each second matching circuit 231*b* are for one bank or one bank group. This is because the fuse array in the memory may be configured to store any failed address in all banks and bank groups, but the redundant addresses are distributed in the banks or the bank groups. To be specific, the fuse array may include fuse addresses of different segments, which are respectively configured to map to redundant addresses in different banks or bank groups.

In addition, when the fuse addresses are broadcast, all the fuse addresses are sequentially broadcast in a polling manner. Therefore, in an address matching process, it is necessary to determine a specific bank or bank group with a redundant address being mapped to each of the fuse addresses. Therefore, the address matching circuit 231 includes multiple first matching circuits 231*a* configured to match fuse addresses mapped to the first redundant addresses in multiple different banks or bank groups, and further includes multiple second matching circuits 231*b* configured to match fuse addresses mapped to the last redundant addresses in multiple different banks or bank groups.

For example, each first matching circuit 231*a* and each second matching circuit 231*b* include a first-stage NAND gate and a second-stage NOR gate, where the first-stage NAND gate may include multiple NAND gates, and an input terminal of the second-stage NOR gate is connected to all output terminals of the first-stage NAND gate. Multiple input terminals of the first-stage NAND gate may be respectively configured to receive a row address, a column address, and an area address that are obtained after inverse processing or that do not undergo inverse processing, identification information of a bank or bank group mapped to the fuse address, other required identification information, and the like, so that input of the first-stage NAND gate is all 1 only when a fixed address value (e.g., a fuse address value corresponding to the first redundant address or a fuse address value corresponding to the last redundant address) is input. For information undergoing the foregoing operation, logic 1 is output only in a case of a fixed address value. In this way, a logical operation may be set, so that the first matching circuit outputs the logic 1 only when a fuse address mapped to the first redundant word line in a specified bank or bank group is matched, or the second matching circuit outputs the logic 1 only when a fuse address mapped to the last redundant word line is matched.

For example, as shown in FIG. 6, the first-stage NAND gate includes a three-input NAND gate NAND1 and a two-input NAND gate NAND2. An input terminal of the NAND1 is configured to receive an active signal Banki (i may be a counting sequence number of any bank or bank group), a column address X Addr, and a column address Y Addr that are of a currently broadcast bank or bank group, or an inverted signal of the foregoing signal (that is, an inverter may be connected at a location of a dotted line in FIG. 6). An input terminal of the NAND2 is configured to receive an area address S Addr or an inverted signal thereof (an inverter may be connected at a location of a dotted line in FIG. 6), and an address clock signal clk. Output signals of the two NAND gates are input to a NOR gate (NOR). When all input signals match a predetermined signal (that is, a currently broadcast fuse address matches a preset fuse address), the NOR gate (NOR) outputs the logic 1, that is, the high-level signal is utilized as the first matching signal 1st RWL or the second matching signal last RWL, and is provided to the indication signal generation unit 232.

In this way, when the address matching circuit does not match the fuse address mapped to the first redundant address and the fuse address mapped to the last redundant address, the address matching circuit keeps outputting logic 0, that is, outputting the low-level signal. When the fuse address mapped to the first redundant address is matched, the logic 1 is output and is provided to the indication signal generation unit 232 as the first matching signal 1st RWL, to pull up an output signal of the indication signal generation unit 232. When the fuse address mapped to the last redundant address is matched, the logic 1 is output again and is provided to the indication signal generation unit 232 as the second matching signal last RWL, to pull down the output signal of the indication signal generation unit 232.

Figure 7:
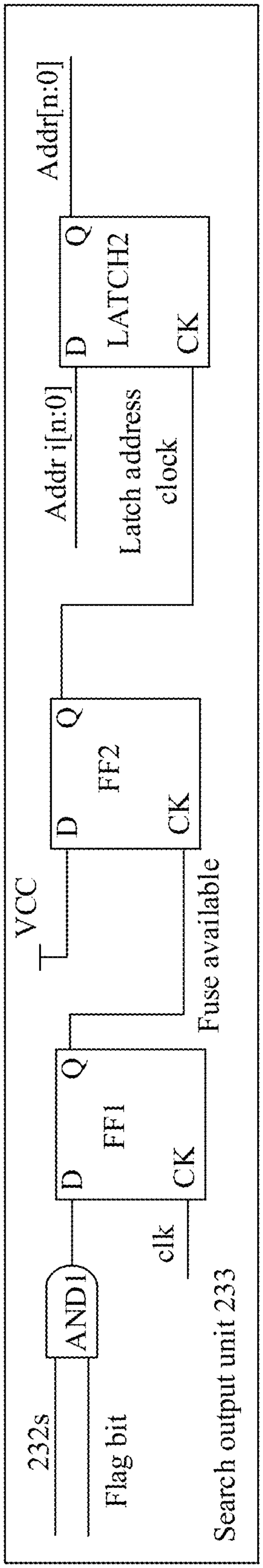
FIG. 7 is a schematic structural diagram of a search output unit in a repair circuit according to an embodiment of the present disclosure.

In some embodiments, as shown in FIG. 7, the search output unit 233 includes: a first AND gate AND, where a first input terminal of the first AND gate is connected to an output terminal of the first latch LATCH1, and a second input terminal of the first AND gate is configured to receive the flag bit information;

- a first flip-flop FF1, where a signal input terminal of the first flip-flop is connected to an output terminal of the first AND gate AND1, and a clock input terminal of the first flip-flop is configured to receive the broadcast clock signal;
- a second flip-flop FF2, where a signal input terminal of the second flip-flop is connected to a first power supply terminal VCC, and a clock input terminal of the second flip-flop is connected to an output terminal of the first flip-flop FF1; and
- a second latch LATCH2, where a signal input terminal of the second latch is connected to the address broadcasting unit 220, and is configured to sequentially receive the currently broadcast fuse addresses Fuse addr i[n:0], and a clock input terminal of the second latch is connected to an output terminal of the second flip-flop FF2.

The second latch LATCH2 outputs the target fuse address when the first latch LATCH1 outputs the high-level signal and the flag bit information indicates that the flag bit is unused.

When the flag bit information (Fuse used bit) is "1", it indicates that a currently broadcast fuse address is unused, and the flag bit information is directly input to the first AND gate AND. When the flag bit information (Fuse used bit) being "0" indicates that the currently broadcast fuse address is unused, the flag bit signal is inverted and then input to the first AND gate AND.

Figure 8:
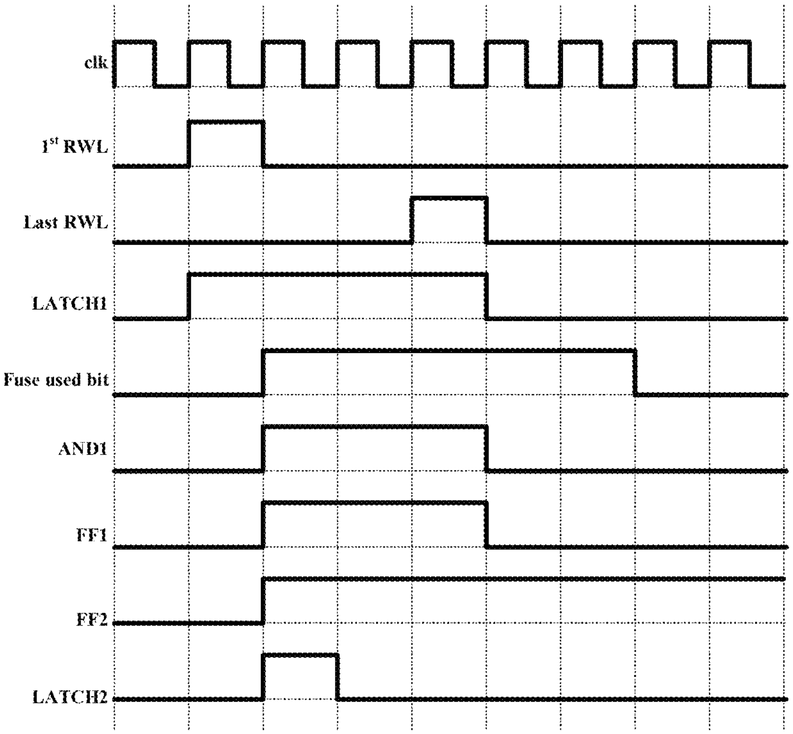
FIG. 8 is a schematic diagram of signal waveforms in a repair circuit according to an embodiment of the present disclosure.

A signal waveform of the foregoing circuit is shown in FIG. 8. When the first latch LATCH1 outputs a high level, it indicates that a currently broadcast fuse address is the target fuse address mapped to the target redundant address. When the flag bit information (Fuse used bit) being "1" indicates that the currently broadcast fuse address is unused, the flag bit information is directly input to the first AND gate AND, and when the flag bit information (Fuse used bit) being "0" indicates that the currently broadcast fuse address is unused, the flag bit signal is inverted and then input to the first AND gate AND. Therefore, a Fuse used bit of an unused fuse is 1 at the input terminal of the first AND gate AND, and when the first AND gate AND outputs a high-level signal, it indicates that the currently broadcast fuse address is a fuse address that can be utilized to repair a failed address. An output signal of the first AND gate AND is transmitted to the first flip-flop FF1, so that a signal output by the first flip-flop is utilized as a clock signal of the second flip-flop FF2. It may be understood that, when the first AND gate AND outputs the high-level signal, the second flip-flop FF2 is correspondingly triggered to output a high-level signal. Because the output signal of the first flip-flop is utilized as the clock signal of the second flip-flop FF2, after the first flip-flop FF1 outputs a high-level signal, an output signal of the second flip-flop FF2 jumps to the high-level signal and maintains the high-level signal. In this way, the high-level signal is utilized as a clock signal of the second latch LATCH2. The currently broadcast fuse address, that is, the first fuse address that can be utilized to repair a failed address, is output only when the high-level signal jumps.

It should be noted that the second latch LATCH2 may also be implemented through a flip-flop.

In some embodiments, as shown in FIG. 9, the repair circuit further includes:

- a local register 250, including multiple address registers 251, where the address registers 251 are mapped to the redundant addresses in a one-to-one manner in order, and the local register 250 is configured to store address data that is stored in the at least part of the fuse addresses in the fuse array that are in one-to-one mapping with the redundant addresses; and
- an address decoding unit 260, connected to the local register 250, and configured to: receive a to-be-accessed address, access a mapped redundant address when the to-be-accessed address is consistent with a failed address stored in the local register, and access the to-be-accessed address when the to-be-accessed address is inconsistent with the failed address.

In this embodiment of the present disclosure, the fuse array may be broadcast to read addresses stored in the fuse array to the local register 250. Local registers are in a one-to-one mapping relationship with the redundant addresses. To be specific, when the address decoder 260 decodes an address stored at a specified location in the local register, the address decoder 260 decodes the address to a fixed redundant address regardless of which memory cell the address actually points to. In other words, the local registers are in one-to-one mapping with the fuse addresses in the fuse array, and are in one-to-one mapping with the redundant addresses. Therefore, when a failed address is stored in a fuse address, the failed address may be read to a corresponding local register 250 through broadcast and be stored. When receiving a command for accessing the failed address, the address decoder 260 decodes a redundant address mapped to the local register 250 storing the failed address. When a to-be-accessed address is not a failed address, the address decoder performs normal decoding.

Figure 10:
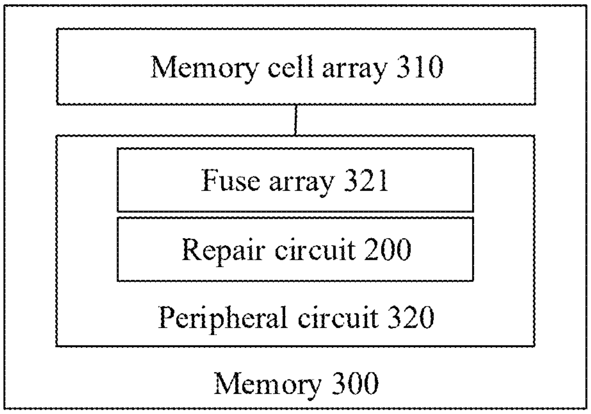
FIG. 10 is a schematic diagram of another memory according to an embodiment of the present disclosure.

An embodiment of the present disclosure further provides a memory. As shown in FIG. 10, the memory 300 includes:

- a memory array 310, where the memory array includes multiple memory cells and multiple redundant cells, the memory cells have memory cell addresses, and the redundant cells have redundant addresses; and
- a peripheral circuit 320, where the peripheral circuit includes a fuse array 321, the fuse array includes multiple fuse cells, and the fuse cells have fuse addresses; and the repair circuit 200 provided in any one of the foregoing embodiments.

It should be understood that "some embodiments", "an embodiment", or "one embodiment" mentioned throughout the specification means that specific features, structures, or characteristics related to the embodiments are included in at least one embodiment of the present disclosure. Therefore, "in an embodiment" or "in one embodiment" occurring throughout the specification does not necessarily refer to the same embodiment. In addition, these specific features, structures, or characteristics may be combined in one or more embodiments in any appropriate manner. It should be understood that in various embodiments of the present disclosure, sequence numbers of the foregoing processes do not mean an execution sequence. The execution sequence of the processes should be determined based on functions and internal logic of the processes, and should not constitute any limitation on an implementation process of the embodiments of the present disclosure. The sequence numbers of the foregoing embodiments of the present disclosure are merely for the purpose of description, and are not intended to indicate priorities of the embodiments.

It should be noted that in this specification, the terms "include", "comprise", or any other variant thereof are intended to cover non-exclusive inclusion, so that a process, method, article, or apparatus including a series of elements includes not only those elements but also other elements that are not expressly listed, or further includes elements inherent to such a process, method, article, or apparatus. An element preceded by "includes a . . . " does not, without more constraints, preclude the presence of additional identical elements in the process, method, article, or apparatus including the element.

The above is only implementations of the present disclosure and is not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A repair method for a memory, the memory comprising a memory array and a fuse array, the memory array comprising a plurality of memory cells and a plurality of redundant cells, the memory cells having memory cell addresses, the redundant cells having redundant addresses, the fuse array comprising a plurality of fuse cells, and the fuse cells having fuse addresses; at least a part of the fuse addresses being in one-to-one mapping with preset redundant addresses; and the repair method comprising:

receiving, by the memory, a repair instruction sent from outside the memory, the repair instruction carrying a failed address, and the failed address being a memory cell address of a failed memory cell;

broadcasting the fuse array and sequentially determining whether a currently broadcast fuse address is a target fuse address, until at least one target fuse address is found, the target fuse address being a fuse address mapped to a target redundant address, and the target redundant address being capable of repairing the failed address; and writing the failed address into a first unused target fuse address in the at least one target fuse address, to access the target redundant address when a request for accessing the failed address is received;

wherein the broadcasting the fuse array and sequentially determining whether a currently broadcast fuse address is a target fuse address specifically comprises:

determining whether the currently broadcast fuse address is a fuse address mapped to a redundant address in a same bank or bank group as the failed address; and if yes, determining the currently broadcast fuse address as a first fuse address; or if no, continuing to read a next address; and determining whether the first fuse address is unused; and if yes, determining the first fuse address as the target fuse address; or if no, continuing to read a next address.

2. The repair method according to claim 1, wherein the determining whether the currently broadcast fuse address is a fuse address mapped to a redundant address in a same bank or bank group as the failed address specifically comprises:

determining whether the currently broadcast fuse address is a fuse address mapped to a first redundant address in the same bank or bank group as the failed address; and determining whether the currently broadcast fuse address is a fuse address mapped to a last redundant address in the same bank or bank group as the failed address; and the determining the currently broadcast fuse address as a first fuse address comprises: determining, as the first fuse address, each fuse address between the fuse address mapped to the first redundant address in the same bank or bank group as the failed address and the fuse address mapped to the last redundant address in the same bank or bank group as the failed address.

3. The repair method according to claim 2, wherein the broadcasting the fuse array specifically comprises:

determining a currently read out fuse address by separately counting an area address, a row address, and a column address of the fuse array;

the determining whether the currently read out fuse address is a fuse address mapped to a first redundant address in the same bank or bank group as the failed address specifically comprises:

determining whether count values of the area address, the row address, and the column address of the currently read out fuse address are an area address, a row address, and a column address of the fuse address mapped to the first redundant address; and if yes, pulling up a first target address indication signal; and the determining whether the currently read out fuse address is a fuse address mapped to a last redundant address in the same bank or bank group as the failed address specifically comprises:

determining whether the count values of the area address, the row address, and the column address of the currently read out fuse address are an area address, a row address, and a column address of the fuse address mapped to the last redundant address; and if yes, pulling down the first target address indication signal.

4. The repair method according to claim 2, wherein the method further comprises:

if the currently read out fuse address is mapped to the last redundant address, and the current first fuse address is not an unused fuse address, updating a value of a resource register in a current bank or bank group to a first value indicating no available redundant address, and terminating a repair operation.

5. A repair circuit for a memory, the memory comprising a memory array and a fuse array, the memory array comprising a plurality of memory cells and a plurality of redundant cells, the memory cells having memory cell addresses, the redundant cells having redundant addresses, the fuse array comprising a plurality of fuse cells, and the fuse cells having fuse addresses; at least a part of the fuse addresses being in one-to-one mapping with preset redundant addresses; and the repair circuit comprising:

an instruction receiving unit, configured to receive a repair instruction sent from outside the memory, the repair instruction carrying a failed address configured to indicate a failed memory cell address;

an address broadcasting unit, connected to the fuse array and the instruction receiving unit, and configured to broadcast the fuse array;

an address searching unit, connected to the address broadcasting unit, and configured to sequentially receive fuse addresses broadcast by the address broadcasting unit and determine whether a currently broadcast fuse address is a target fuse address, until at least one target fuse address is found, the target fuse address being a fuse address mapped to a target redundant address, and the target redundant address being capable of repairing the failed address; and an address programming unit, connected to the fuse array and the address searching unit, and configured to: decode a first unused target fuse address in the at least one target fuse address, and program the failed address into a fuse cell corresponding to the target fuse address;

wherein the address searching unit comprises:

an address matching circuit, connected to the address broadcasting unit to sequentially receive the fuse addresses broadcast by the address broadcasting unit, and configured to match, based on the fuse addresses broadcast by the address broadcasting unit, a fuse address mapped to a first redundant address in at least one bank or bank group, and a fuse address mapped to a last redundant address in the at least one bank or bank group;

an indication signal generation unit, connected to the address matching circuit, and configured to: output a high-level signal when a broadcast fuse address matches the fuse address mapped to the first redundant address, and output a low-level signal when the broadcast fuse address matches the fuse address mapped to the last redundant address; and a search output unit, connected to the fuse array and the address broadcasting unit, and configured to: read, based on a fuse address broadcast by the address broadcasting unit, flag bit information of the fuse address, and output the fuse address when the flag bit information indicates that the fuse address is unused.

6. The repair circuit according to claim 5, wherein the address matching circuit comprises:

a first matching circuit, configured to: determine whether the broadcast fuse address matches the fuse address mapped to the first redundant address, and output a first matching signal) to the indication signal generation unit when the broadcast fuse address matches the fuse address mapped to the first redundant address; and a second matching circuit, configured to: determine whether the broadcast fuse address matches the fuse address mapped to the last redundant address, and output a second matching signal to the indication signal generation unit when the broadcast fuse address matches the fuse address mapped to the last redundant address; and the indication signal generation unit comprises a first latch, the first latch outputting the high-level signal when receiving the first matching signal, and outputting the low-level signal when receiving the second matching signal.

7. The repair circuit according to claim 6, wherein the search output unit comprises: a first AND gate, a first input terminal of the first AND gate being connected to an output terminal of the first latch, and a second input terminal of the first AND gate being configured to receive the flag bit information;

a first flip-flop, a signal input terminal of the first flip-flop being connected to an output terminal of the first AND gate, and a clock input terminal of the first flip-flop being configured to receive a broadcast clock signal of the broadcast;

a second flip-flop, a signal input terminal of the second flip-flop being connected to a first power supply terminal, and a clock input terminal of the second flip-flop being connected to an output terminal of the first flip-flop; and a second latch, a signal input terminal of the second latch being connected to the address broadcasting unit and being configured to sequentially receive the broadcast fuse addresses, and a clock input terminal of the second latch being connected to an output terminal of the second flip-flop; and the second latch outputting the target fuse address when the first latch outputs the high-level signal and the flag bit information indicates that the flag bit is unused.

8. A memory, comprising:

a memory array, the memory array comprising a plurality of memory cells and a plurality of redundant cells, the memory cells having memory cell addresses, and the redundant cells having redundant addresses; and a peripheral circuit, the peripheral circuit comprising a fuse array, the fuse array comprising a plurality of fuse cells, and the fuse cells having fuse addresses; and the repair circuit according to claim 5.

* * * * *